Aug. 17, 1926.

W. W. RUTTER

SEAL

Filed April 5, 1924

1,596,767

Inventor
William Walter Rutter
per
E.J. Fetherstonhaugh
Attorney.

Patented Aug. 17, 1926.

1,596,767

UNITED STATES PATENT OFFICE.

WILLIAM WALTER RUTTER, OF EDMONTON, ALBERTA, CANADA.

SEAL.

Application filed April 5, 1924. Serial No. 704,422.

My invention relates to improvements in "seals" for the sealing of freight or other cars and consists of a metal container in which the sealing strip is securely fastened by means of a spring clip affixed therein, and once a car is sealed it is impossible to open same without destroying the seal.

I attain these objects by means of the mechanism illustrated in the accompanying drawings, in which:—

Similar letters refer to similar parts throughout the various views.

Figure 1:
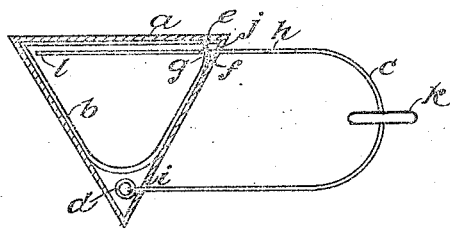
Fig. 1 is a sectional view of the seal in a locked position.
Figure 2:
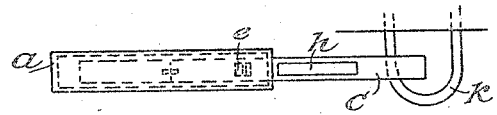
Fig. 2 is a top view of the seal.
Figure 3:
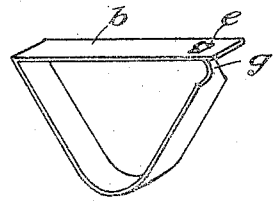
Fig. 3 is a perspective view of the locking spring.
Figure 4:
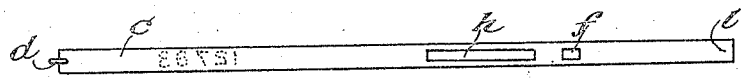
Fig. 4 is a plan of the sealing strip.

$a$ is the container in which is fitted locking spring $b$. $c$ is the sealing strip which is of metal and has stamped thereon the station sealing number. $d$ is a metal ring which is attached to one end of sealing strip $c$ and fits within the bottom of the container $a$, holding the end of the sealing strip securely fastened therein, the other end $l$ of the sealing strip passes through a small opening $i$ in container $a$ and looping through the hasp and staple $k$ securing the car door, enters the upper portion of container through opening $j$ and presses down the end $g$ of locking spring $b$ until said end $g$ engages with a hole $e$ in sealing strip $c$. The end $g$ of locking spring $b$ then springs back and is held in a locked position by the opening $f$ in the locking spring.

A long opening $h$ is cut in sealing strip $c$ on the portion exposed just outside of container, so that if seal is tampered with and broken, the remaining portion of sealing strip cannot be forced in to engage with the locking spring $b$.

What I claim as my invention is:—

A car seal comprising a metal strip having at one end a ring hole and anchoring ring therein and towards the other end a plurality of slots, one for latching and the other for weakening the strip, a spring latch forming part with and extending from one end of a slotted latch bar in substantially U-shape, and a casing having inlet and outlet strip slots and containing said U-shaped spring latch and latch bar, said spring latch forming in said casing a sealed chamber for the anchoring ring end of said strip and engaging the latter at the other end through the latch slot and locking in said latch bar.

Signed at the city of Edmonton, this 7th day of March, 1924.

WILLIAM WALTER RUTTER.